… … …

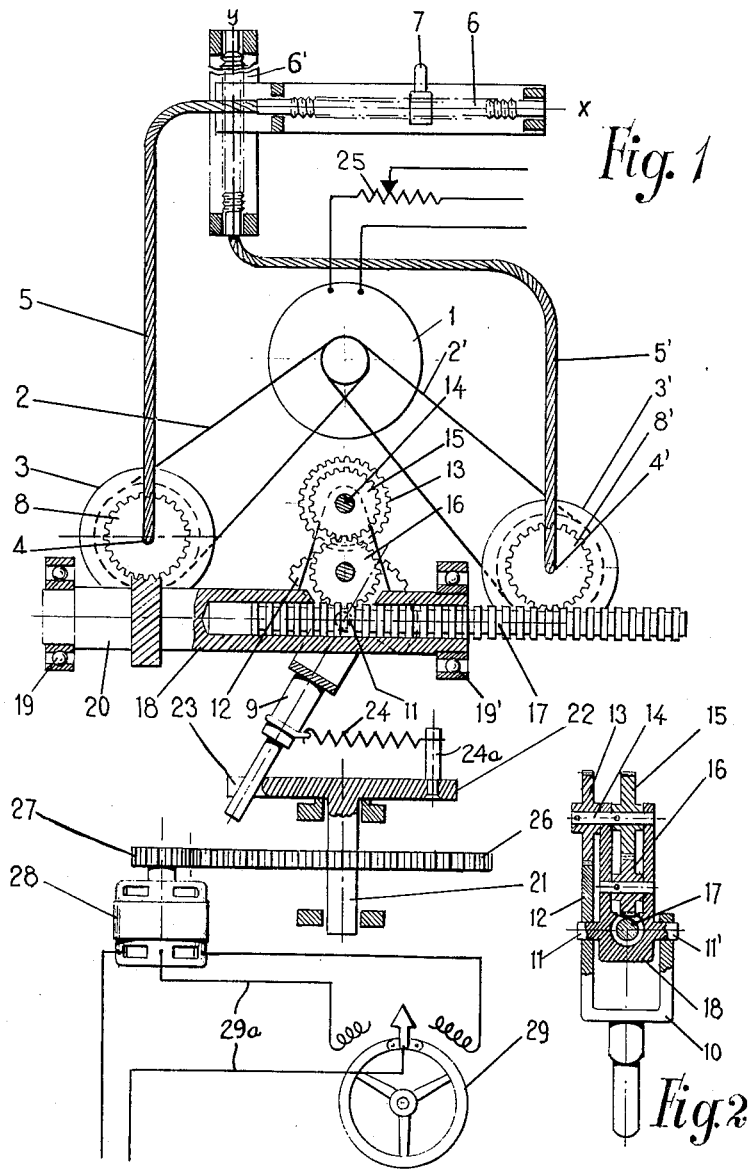

United States Patent Office 3,005,262
Patented Oct. 24, 1961

3,005,262
CONTROL DEVICE FOR COORDINATOMETERS
IN PHOTOGRAMMETRIC EQUIPMENTS
Umberto Nistri, Via Della Vasca Navale 81,
Rome, Italy
Filed Feb. 8, 1957, Ser. No. 639,031
Claims priority, application Italy Sept. 27, 1956
3 Claims. (Cl. 33—1)

A generally known arrangement for controlling the axial motions in Cartesian coordinatometers consists of a rod pivoted to the inner ring of a Cardanic joint. When moved from its zero position (perpendicular to the plane containing the two axes of the Cardanic joint), the said rod drives into angular motion either or both of the axes of the said joint. Such motion or rotation controls the movement of the control organs of the coordinatmeter, and consequently the composite movement of the indicator point (index, tracing pen, etc.).

In these devices, the spatial movement of the rod around the center of the Cardanic joint coordinates and controls all of the dynamic elements of the motion: in effect, the vector which represents the motion of the point of a given moment is determined directionally by the spatial position of the rod, and in terms of length (speed of the point) by the angle formed by the rod with the perpendicular to the initial plane of the Cardanic axes.

The use of such a device offers certain difficulties which ultimately reduce, and almost always offset, the advantage offered by the single control.

When, for instance, the speed must be changed without changing the direction, the control rod must be moved in the same plane that it forms with its zero position. This proves always difficult, and a deviation in the direction of motion is also introduced. Similarly, if the direction must be changed without changing the speed, the rotation of the plane in wihch the rod lies is likely to be accompanied by a change in the angle of the rod, and consequently in the velocity of the indicator point.

Furthermore, in the system of single control for coordinatometers, the operators show a tendency, once the direction of travel is changed, to move the control back, similarly to what they are accustomed to do with a steering wheel, which must be brought back to center to resume straight running after a change in direction.

The present invention is designed to meet a twofold object: (1) separating, in rod controls, the velocity control from the direction control; (2) creating a control of the system thus modified in which the zero position corresponds to a straight-line motion in any direction, and in which clockwise or counterclockwise rotations generate, in the direction of the indicator point, a deviation in the same sense, the curves described being proportional to the magnitude of the said rotations, similarly to what happens in the steering of a motor vehicle.

The description of the invention will be more easily understood by referring to the enclosed drawing which represents, as a non-limiting example, a preferred embodiment thereof.

In the drawing:

FIG. 1 represents the general arrangement of one embodiment of the device;

FIG. 2 represents a straight cross-section of the center part of the device, for greater clarity in the description.

With reference to the figures, a single motor (1) drives simultaneously, through the drives 2 and 2', the main shaft of two mechanical speed variators 3 and 3', whose output shafts 4 and 4' are connected by means of flexible shafts 5 and 5' to the coordinatometer screws 6 and 6' which control the indicator point 7. The speed variators 3 and 3' are known in the art and are illustrated, for example, in the drawing of U.S. Patent No. 1,873,126, to Hugershoff, wherein they are indicated by the reference numerals 6 to 11.

In the variators 3 and 3', the speed variation controls are fitted with two gears 8 and 8' which are in turn driven by the Cardanic rod system in the following manner:

The central rod 9 terminates with a fork 10 pivoted around 11 and 11' and bearing on one side a gear sector or quadrant 12. The latter meshes with gear 13 which, through the axle 14 is fixed to a gear 15. The gear 15, in turn, drives the rack 17 through the satellite gear 16. All of these parts are supported by the bracket 18, which can rotate in bearings 19 and 19' around an axis of shaft 20 lying in the same plane as pivots 11 and 11'. The point common to the two axes is therefore the rod fulcrum. The rotation of the bracket 18 varies the rate of rotation of shaft 5 produced by motor 1, thereby affecting the shaft of the axis "x," and the cylindrical rack 17, which moves when the rod pivots around 11 and 11', acts through the gear 8' to vary the position of the variator 3' and thus to vary the speed of movement of the indicator point along axis "y." The parts are arranged in such a way that, when the rod 9 is in vertical position, both speed variators are in zero position and the velocity of the indicator point is zero. Under these conditions, the rod operates in the known manner described above. Any movement of the rod changes the velocity of the indicator point in proportion to the angle of the movement, the direction of motion being controlled by the direction in which the rod is moved, as indicated above.

In the same direction of the rod in the rest position, i.e. perpendicular to the plane in which lie the two Cardanic axes, namely, the axis 11 and the axis of the shaft 20 in the zero position, there is positioned a shaft 21 ending with a disc 22 in which is provided a slot 23, the width of which is equal to the diameter of the end of the rod 9.

The latter fits into the slot, and is located therein by the spring 24 which is attached to a pin 24a carried by the disc 22 and located substantially diametrically opposite the slot 23. Thus, as the disc 22 rotates in its plane, the plane described by the axis of the rod at the given inclination and by the same axis in the zero position is made to rotate around the latter axis, assuming all possible directions without varying the angle between the two axes; in other words, as indicated above, the vector which represents the motion of the controlled indicator point 7 is made to rotate without varying its length, i.e. the velocity of the point.

To change the velocity, the speed of the main motor is changed by means of a variable resistance 25. As indicated above, this arrangement results in the speed and direction controls being separate and independent; to each position of the disc 22 corresponds a given direction of the motion of the indicator point 7, and to each position of the resistance 25 corresponds a given velocity of the said point. The shaft 21 carries a gear 26 which meshes with the gear 27 mounted on the shaft of a motor 28. This motor is stopped when the handwheel 29 is at rest, as shown in the figure. The handwheel 29 is connected with the motor 28 by suitable wiring 29a. When the handwheel is turned right or left, the motor rotates right or left at a speed proportional to the extent of rotation of the handwheel.

This causes a rotation of the disc 22 and consequently a variation in the direction of motion of the point 7. As the handwheel 29 is brought back to center, the motor 28 stops and the indicator point moves in the direction it was following at the moment the handwheel was brought back to center.

What I claim is:

1. In combination with a Cardanic joint having interconnected outer and inner actuating members having intersecting Cardanic axes; a coordinatometer having an indicator point and having means for independently shifting the indicator point in two coordinate directions; two variable speed drives; means operatively connecting said drives to the coordinatometer, each speed drive being connected to drive the indicator point in one of its coordinate directions; means operatively connecting said inner and outer members to vary the speed of said variable speed drives responsive respectively to the movement of said members about the two coordinate axes; and a rod having a free end and another end fixed to said outer member for actuating the Cardanic joint; a control device comprising a disc, and means rotating said disc about an axis passing through the intersection point of said Cardanic axes, said disc having formed therein a slot containing said free end of the rod, whereby the rotation of said disc causes said rod to describe a cone of fixed aperture, the apex of which coincides with said intersection point.

2. In combination with a Cardanic joint having interconnected outer and inner actuating members having intersecting Cardanic axes; a coordinatometer having an indicator point and having means for independently shifting the indicator point in two coordinate directions; two variable speed drives; means operatively connecting said drives to the coordinatometer, each speed drive being connected to drive the indicator point in one of its coordinate directions; means operatively connecting said inner and outer members to vary the speed of said variable speed drives responsive respectively to the movement of said members about the two coordinate axes; and a rod having a free end and another end fixed to said outer member for actuating the Cardanic joint, a control device comprising a disc, means rotating said disc about an axis passing through said intersection point, said disc having formed therein a slot containing said free end of the rod; a pin carried by said disc and located substantially diametrically opposite said slot, and a spring having one end connected to said pin and another end connected to said free end of the rod, whereby the rotation of said disc causes said rod to describe a cone of fixed aperture, the apex of which coincides with said intersection point.

3. In combination with a Cardanic joint having interconnected outer and inner actuating members having intersecting Cardanic axes; a coordinatometer having an indicator point and having means for independently shifting the indicator point in two coordinate directions; two variable speed drives; means operatively connecting said drives to the coordinatometer, each speed drive being connected to drive the indicator point in one of its coordinate directions; means operatively connecting said inner and outer members to vary the speed of said variable speed drives responsive respectively to the movement of said members about the two coordinate axes; and a rod having a free end and another end fixed to said outer member for actuating the Cardanic joint; a control device comprising a disc having formed therein a slot containing said free end of the rod, an electric motor, a gear train connecting said motor with said disc for rotating said disc about an axis passing through the intersection point of said Cardanic axes, a handwheel, and means connecting said handwheel with said motor for controlling the speed and direction of rotation of said motor depending upon the extent and direction of rotation of said handwheel from a central zero position, the rotation of said disc causing said rod to describe a cone of fixed aperture, the apex of which coincides with said intersection point.

References Cited in the file of this patent

UNITED STATES PATENTS

| 270,759 | Darkin | Jan. 16, 1883 |
| 702,225 | Larrabee | June 10, 1902 |
| 1,024,631 | James | Apr. 30, 1912 |
| 1,925,207 | Santoni | Sept. 5, 1933 |
| 2,466,985 | Goldberg | Apr. 12, 1949 |
| 2,785,599 | Sonnberger et al. | Mar. 19, 1957 |
| 2,797,579 | Blachut et al. | July 2, 1957 |

FOREIGN PATENTS

| 278,199 | Germany | Sept. 26, 1914 |
| 309,073 | Great Britain | Feb. 20, 1930 |
| 953,766 | France | May 30, 1949 |